US005755493A

United States Patent [19]
Kodaverdian

[11] Patent Number: 5,755,493
[45] Date of Patent: *May 26, 1998

[54] VEHICLE SEAT AND SYSTEM FOR CONTROLLING THE SAME

[75] Inventor: Levik Kodaverdian, Burbank, Calif.

[73] Assignee: P. L. Porter Co., Woodland Hills, Calif.

[*] Notice: The term of this patent shall not extend beyond the expiration date of Pat. No. 5,651,587.

[21] Appl. No.: 823,378

[22] Filed: Mar. 24, 1997

Related U.S. Application Data

[63] Continuation of Ser. No. 488,907, Jun. 9, 1995, Pat. No. 5,651,587.

[51] Int. Cl.$^6$ ............................................. A47C 7/50
[52] U.S. Cl. ........................... 297/423.36; 297/362.14
[58] Field of Search .......................... 297/423.1, 423.19, 297/423.2, 423.22, 423.26, 423.28, 423.34, 423.35, 423.36, 217.1, 217.3, 354.12, 361.1, 362.12, 362.13, 423.23, 423.24, 330, 463.1, 362.14, 463.2

[56] References Cited

U.S. PATENT DOCUMENTS

| | | |
|---|---|---|
| 3,794,381 | 2/1974 | Caldemeyer. |
| 3,934,928 | 1/1976 | Johnson. |
| 4,691,964 | 9/1987 | Morgan. |
| 5,098,158 | 3/1992 | Palarski. |
| 5,203,609 | 4/1993 | Stoeckl. |
| 5,352,020 | 10/1994 | Wade et al.. |
| 5,484,188 | 1/1996 | Stoeckl. |

*Primary Examiner*—Milton Nelson, Jr.
*Attorney, Agent, or Firm*—Oppenheimer Poms Smith

[57] ABSTRACT

A vehicle seat including a thigh support, a leg rest, a foot rest and a control system which is adapted to monitor the respective positions of the leg rest and the foot rest. The control system will either move the foot rest to a position where it will not strike the floor during movement of the leg rest or prevent the foot rest from moving in such a manner that it will strike the floor. A control system which is adapted to adjust the back support and leg rest such the seat is in either the sleep orientation or the upright orientation in response to the user's actuation of a single switch may also be used.

11 Claims, 7 Drawing Sheets

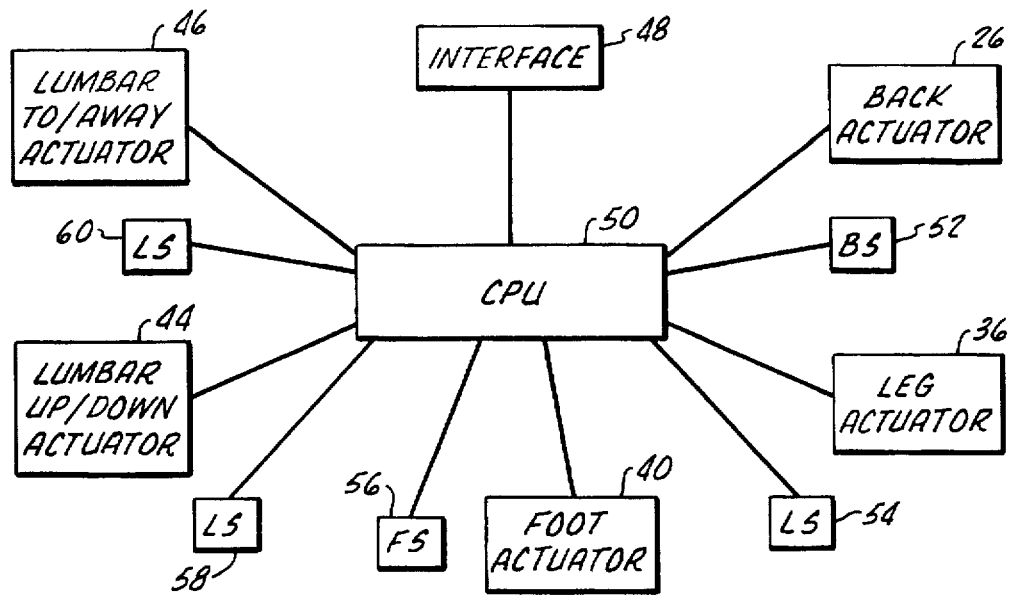
_Fig. 2._
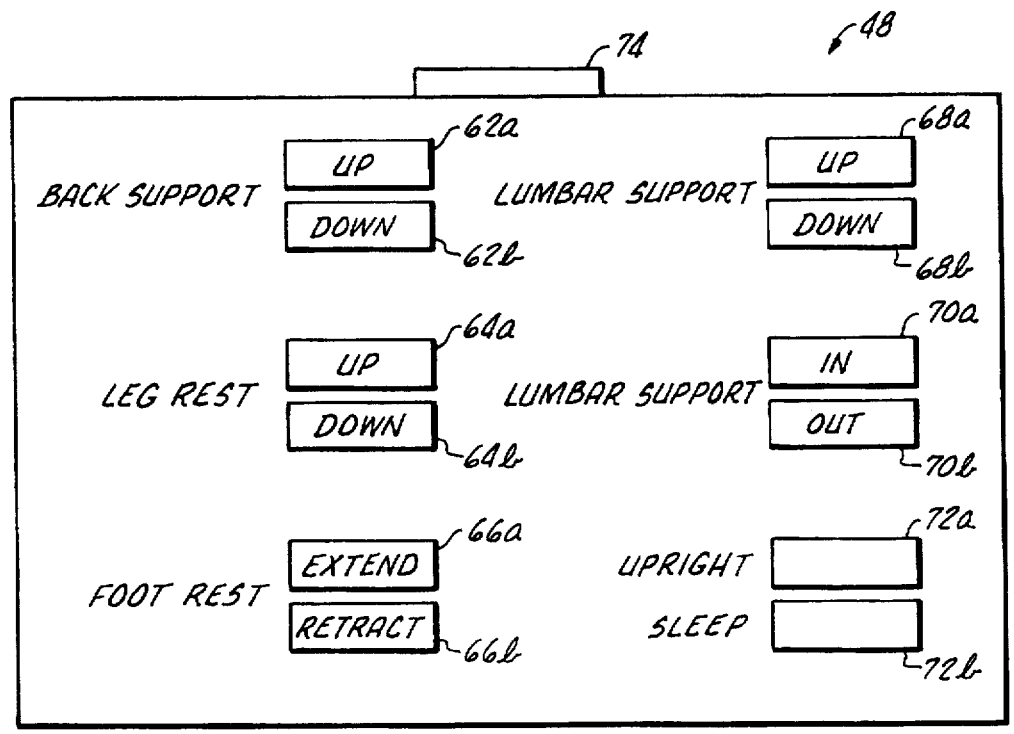
_Fig. 3._

VEHICLE SEAT AND SYSTEM FOR CONTROLLING THE SAME

This application is a continuation of U.S. application Ser. No. 08/488,907, filed Jun. 9, 1995.

BACKGROUND OF THE INVENTION

1. Field of Invention

The present invention relates generally to vehicle seats and, more particularly, to vehicle seats having self-powered back supports, leg rests and foot rests.

2. Description of the Related Art

Vehicle seats, such as those found on airplanes and trains, commonly include a substantially horizontal thigh and buttock support (hereinafter "thigh support") and a back support which pivots about an axis adjacent to the rearward portion of the thigh support. The back support may be reclined from an upright position, through any number of intermediate positions, to a substantially horizontal fully reclined position. Vehicle seats also commonly include leg rests which pivot about an axis adjacent to the forward portion of the thigh support. The leg rest may be pivoted from a substantially vertical storage position, through any number of intermediate use positions, to a substantially horizontal, fully extended use position. In the intermediate and fully extended use positions, the leg rest will provide support for the lower legs of an average sized passenger, from approximately the knee to the ankle. When a passenger is ready to sleep, the back support may be moved to the fully reclined position and the leg rest may be moved to the fully extended use position. Oriented in this manner, the seat will provide a comfortable sleeping surface.

More extravagant seats, such as those found in the first cabin (or first class) section of an airplane, also include a foot rest which is associated with the leg rest. Such foot rests are commonly movable from a retracted non-use position behind the leg rest, through any number of intermediate use positions, to a fully extended use position. In a use position, the foot rest effectively increases the length of the leg rest so that the leg rest will support the passenger's feet as well as his or her lower legs. There are a number of considerations which mitigate against simply employing a longer leg rest that will also support the feet. For example, not all passengers desire foot support. In addition, the length of the leg rest must be less than the distance between the pivot axis associated with the thigh support and the floor of the vehicle to which the seat is secured. A leg rest that is longer than this distance would not be able to pivot to its substantially vertical storage position because it would strike the floor before reaching that position.

Lumbar supports are another common luxury item associated with more extravagant seats. Such lumbar supports are typically capable of adjustment both up and down along the length of the back support and toward and away from the back support.

Many vehicle seats, including the more extravagant seats described above, also include self-powered electromechanical actuators which move the back support and leg rest, as well as the foot rest and lumbar support if included on the seat, to the orientation desired by the passenger. Such self-powered seats typically include a control panel having a variety of buttons, knobs or other similar implements associated with the movable portions of the seat. When, for example, a button corresponding to the back support is pressed, a switch will close and the back support will slowly recline until the button is released or the back support reaches its fully reclined orientation. Similarly, when another button corresponding to the back support is pressed, the back support will slowly incline until the switch is released or the back support reaches its fully upright orientation. The other movable portions of the seat are controlled in a similar manner.

There are, however, a number of disadvantages associated with the conventional vehicle seats described above. For example, passengers often return the leg rest to its storage position before returning the foot rest to its non-use position. As the combined length of the leg rest and extended foot rest is usually greater than the distance between the rotation axis associated with the forward portion of the thigh support and the floor of the vehicle, the foot rest will be forced into the floor before the leg rest reaches its storage position. The seats are often damaged as a result.

Another disadvantage associated with conventional vehicle seats has to do with the number of steps required to adjust the seat to the sleep position, where the back support is fully reclined, the leg rest is fully extended and the foot rest is extended, or to the fully upright position, where the back support is upright and the leg rest and foot rest are in their respective storage and non-use positions. The passenger must determine whether each movable portion of the seat is in the desired position and, if any are not, individually adjust those portions by finding and engaging the appropriate button or knob. This is obviously quite inconvenient.

SUMMARY OF THE INVENTION

The general object of the present invention is to provide a vehicle seat and a method of controlling a vehicle seat which substantially obviate, for practical purposes, the aforementioned problems in the art. In particular, one object of the present invention is to provide a vehicle seat which is adapted to prevent the foot rest from striking the floor when the leg rest is moved to its storage position. Another object of the present invention is to provide a vehicle seat which is capable of adjusting itself to the sleep position or to the fully upright position in response to the actuation of a single button.

In order to accomplish these and other objectives, a preferred embodiment of the present invention is adapted to monitor the respective positions of the leg rest and the foot rest and to either move the foot rest to a position where it will not strike the floor during movement of the leg rest or prevent the foot rest from moving in such a manner that it will strike the floor. Another preferred embodiment is adapted to adjust the back support and leg rest such the seat is in either the sleep orientation or the upright orientation in response to the user's actuation of a single switch.

The present invention provides a number of advantages over the prior art. For example, the present vehicle seat prevents the foot rest from being forced into the floor when the leg rest is lowered. As a result, damage to the seat is prevented and the cost associated with maintaining and replacing the seats is correspondingly reduced. The present invention is also more convenient for the passengers to use. Passengers do not have to retract the foot rest prior to moving the leg rest to the storage position. The seat will do that for them. Passengers can also easily adjust the seat to the sleep position or the fully upright position, regardless of its current orientation, by pressing a single button. As such, passengers will not have to determine which movable portions of seat have to be adjusted, find the corresponding buttons and make the proper adjustments.

The above described and many other features and attendant ad vantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 2 is a is a block diagram of a control system which may be used in conjunction with the vehicle seat illustrated in FIG. 1.

FIG. 3 is a plan view of a control panel user interface in accordance with the present invention.

DETAILED DESCRIPTION OF THE PREFERRED EMBODIMENTS

The following is a detailed description of a preferred embodiment of the present invention. This description is not to be taken in a limiting sense, but is made merely for the purpose of illustrating the general principles of the invention. The scope of the invention is defined by the appended claims.

Figure 1:
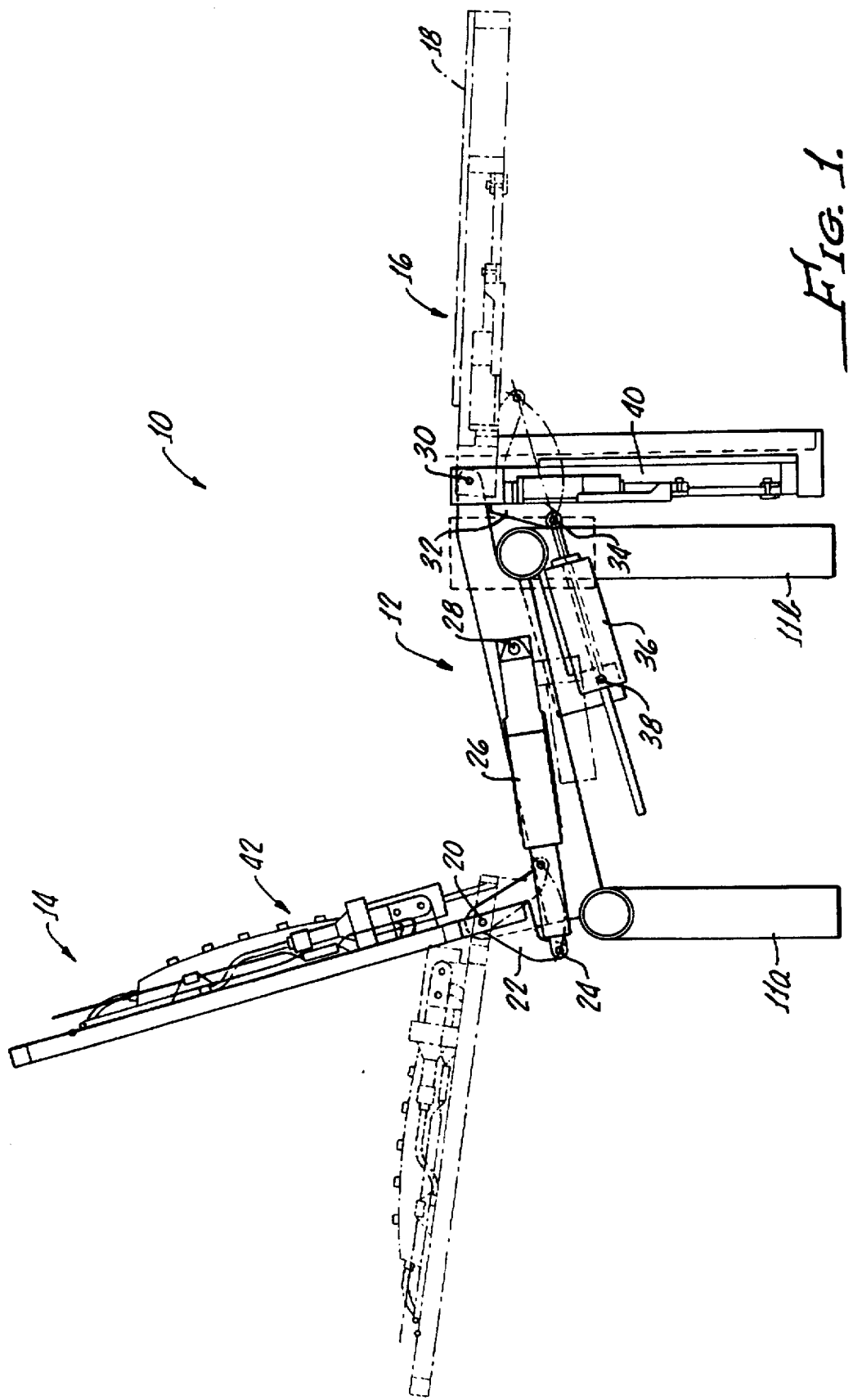
FIG. 1 is a side view of the internal structure of a vehicle seat in accordance with a preferred embodiment of the present invention.

One example of the internal aspects of a vehicle seat in accordance with the present invention is illustrated in FIG. 1. The exemplary seat, which is generally indicated by reference numeral 10, preferably includes legs 11a and 11b, a thigh support 12, a back support 14, a leg rest 16 and a foot rest 18. Back support 14 is pivotally attached to thigh support 12 at a pivot point 20 located at the rearward portion of the thigh support. The back support includes a lever arm 22 that pivots about point 20. One end 24 of an actuator 26 is pivotally attached to lever arm 22 and the other end 28 is pivotally attached to a portion of thigh support 12. Operation of actuator 26 pivots back support 14 between the solid-line fully upright position and the dash-line fully reclined position.

As also shown by way of example in FIG. 1, leg rest 16 is pivotally attached to thigh support 12 at a pivot point 30 located at the forward portion of the thigh support. The leg rest includes a lever arm 32 that pivots about point 30. One end 34 of an actuator 36 is pivotally attached to lever arm 32 and the other end 38 is pivotally attached to a portion of thigh support 12. Operation of actuator 36 pivots leg rest 16 between the solid-line substantially vertical storage position and the dash-line fully extended use position. Foot rest 18 is associated with the free end of leg rest 16. The foot rest includes an actuator 40 which is secured to a portion of the leg rest. Actuator 40 moves the foot rest between the retracted solid-line position and the fully extended dash-line position. As noted above, if a passenger is able to cause the leg rest to move to towards the leg rest storage position while the foot rest is in the extended dash-line position, the foot rest will strike the floor before the leg rest reaches the storage position, thereby damaging the seat.

The exemplary vehicle seat may also include a lumbar support device 42 associated with back support 14 that is capable of two types of movement. The lumbar support moves up and down along the length of the back support and also moves away from the back support and toward the back support. A pair of actuators 44 and 46 (see FIG. 2) may be provided to facilitate such movement.

The actuators described above are preferably of the rotating screw and follower type. The follower is normally a nut that is secured to a movable portion of the seat and the screw is driven by an electric motor. The present invention is not, however, limited to such actuators. Other actuators may be employed. Such other actuators include, but are not limited to, hydraulic piston and cylinder arrangements.

One embodiment of a system for adjusting the position of a vehicle seat, such as the seat illustrated in FIG. 1, will now be described with reference to FIGS. 2–8. As diagrammatically shown in FIG. 2, the system includes a control panel 48 which is operably connected to a central processing unit (CPU) 50. CPU 50 is in turn connected to back support actuator 26, leg rest actuator 36, foot rest actuator 40, and lumbar actuators 44 and 46. A number of position sensing devices 52, 54, 56, 58 and 60, which are respectively associated with the back support, leg rest, foot rest and both aspects of the lumbar support, are also operably connected to the CPU. The position sensing devices are discussed in detail below.

Turning next to FIG. 3, the user interface of the exemplary control panel includes twelve buttons arranged in six pairs. Buttons 62a and 62b correspond to the movement of back support 14. Buttons 64a and 64b correspond to the movement of leg rest 16. Buttons 66a and 66b correspond to the movement of foot rest 18. Buttons 68a and 68b correspond to the up/down movement of the lumbar support. Buttons 70a and 70b correspond to the in/out movement of the lumbar support. Buttons 72a and 72b correspond to the upright mode and sleep mode functions which are discussed in detail below. Each of the buttons is preferably connected to a single pull/single throw/normally open momentary switch. These switches return to the open position when the associated button is released and are generally favored by airlines for safety reasons. When this type of switch is used, the moving portion of the seat will not continue to move when a passenger releases the associated button. A light source 74 may also be provided to illuminate the control panel.

Obviously, the two buttons per moving element design is not an essential aspect of the invention and may be replaced by other suitable alternatives. For example, a three position lever which is capable of engaging the two switches corresponding to a particular moving portion of the seat may be used in place of each button pair. The configuration of the control panel will also change if the number of moving portions of the seat is changed. In addition, other types of user interfaces, such as touch screens and voice actuated systems, may also be used with corresponding modifications to the control panel circuitry.

Figure 4:
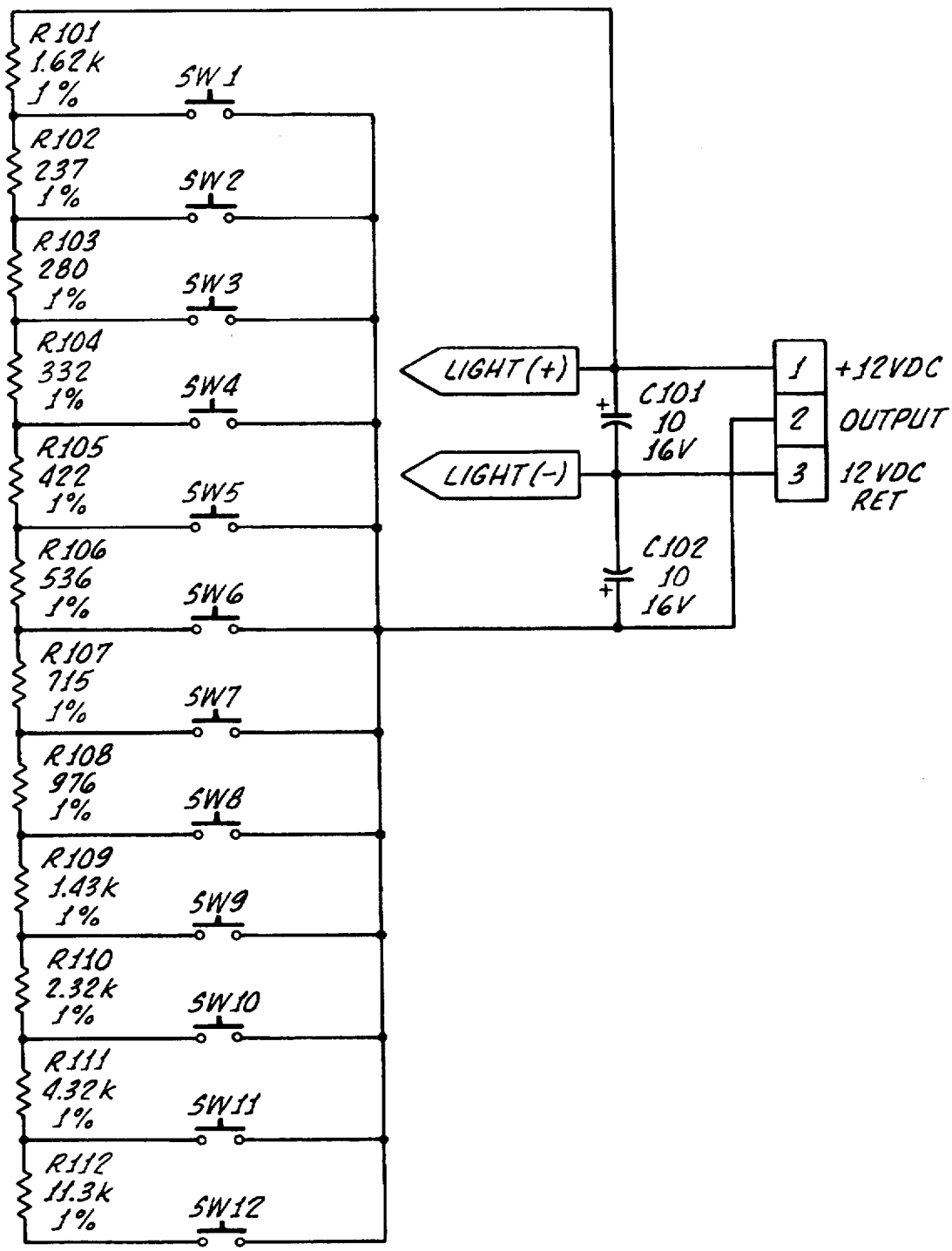
FIG. 4 is a diagram illustrating one embodiment of a control panel circuit.

One example of a control panel circuit which connects the control panel switches to CPU 50 is illustrated in FIG. 4. Each of the twelve switches (numbered SW1–SW12), one for each button, is responsible for a different function. For example, closing SW1 will cause the CPU to raise the leg rest while closing SW2 will cause the CPU to lower the leg rest. Each switch SW1-SW12 has a resister (numbered R101-R112) associated therewith. Each of the resistors has a different resistance and exemplary resistances are shown in FIG. 4. Pressing a button (or buttons) and closing the associated switch (or switches) causes the resistance of the circuit to change. As a constant voltage is applied to the circuit, the current output will vary as a function of which switch, or combination of switches, has been closed. The current output may be measured to determine which button, or combination of buttons, has been pressed. In response, CPU 50 will activate the appropriate actuators in the appropriate directions.

Figure 5:
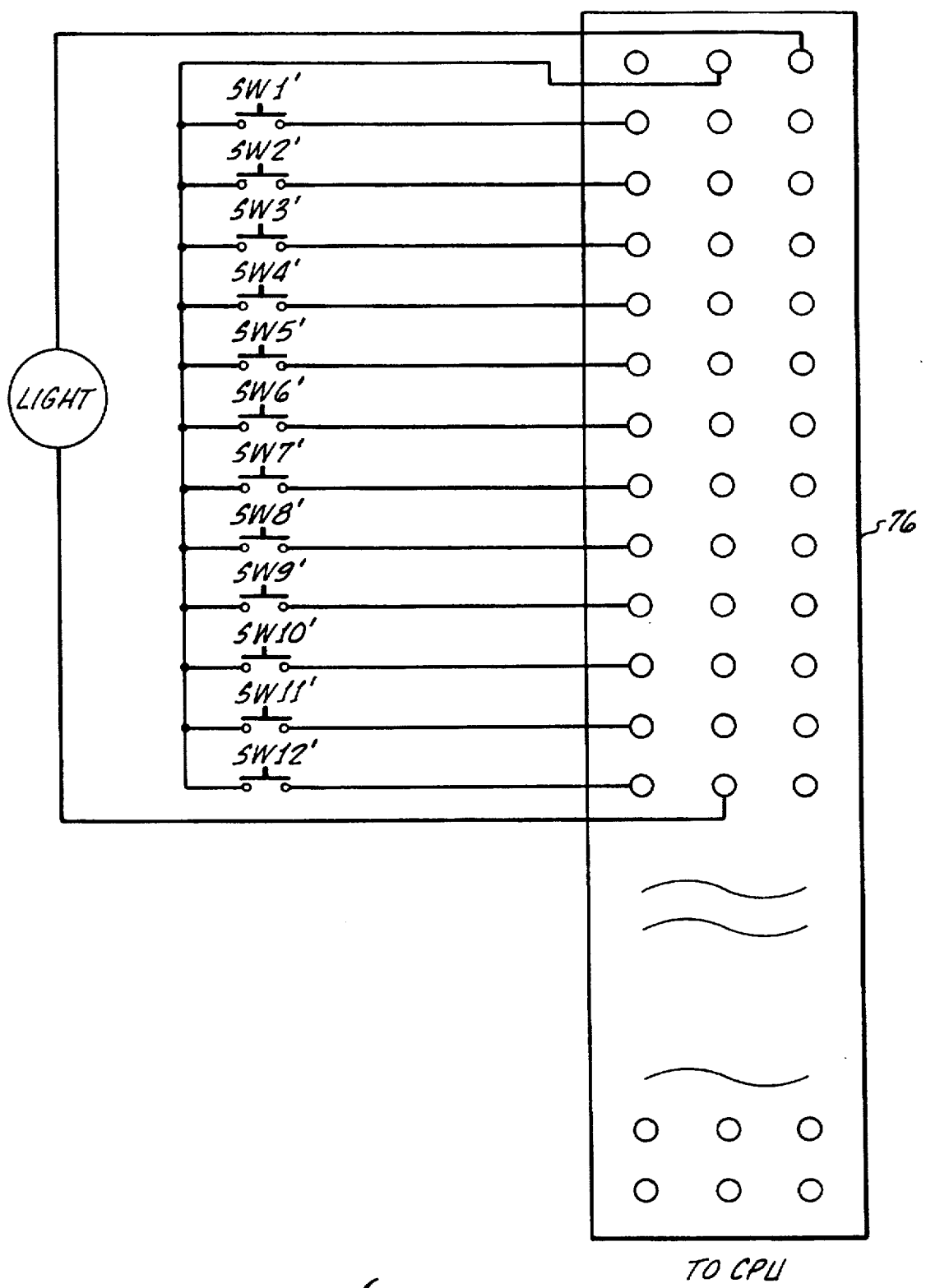
FIG. 5 is a diagram illustrating another embodiment of a control panel circuit.

Alternatively, the control panel circuit may simply individually connect the each of the switches to a connector, such as a 50-pin connector, which is in turn connected to the CPU. Such a circuit is illustrated in FIG. 5. Switches SW1'-SW12' are each connected to a 50-pin connector 76 which is in turn connected to the CPU. When the CPU senses that a switch has been closed due to the pressing of a button, the corresponding actuator will be activated in the appropriate direction.

As noted above, position sensing devices 52, 54, 56, 58 and 60 are provided for determining the location of the movable portions of the seat. Turning first to the back support, foot rest, and lumbar supports, position sensing devices 52, 56, 58 and 60 may each consist of a pair of on/off switches which are connected to CPU 50. One switch will be turned on, and send an "on" signal to the CPU, when the corresponding actuator is fully extended. The other switch will be turned on, and send an "on" signal to the CPU, when the actuator is fully retracted. As a result, the CPU will be able to determine whether the back support, foot rest, and lumbar supports are fully extended, retracted, or somewhere in between.

Figure 6:
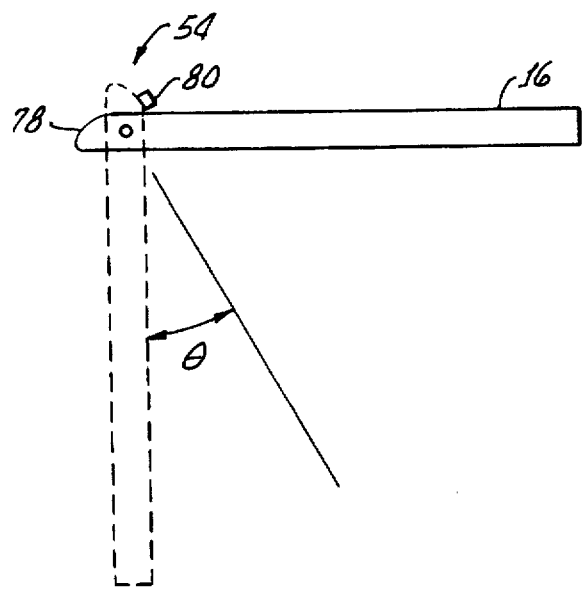
FIG. 6 is a schematic illustration of a leg rest and position sensor in accordance with the present invention.
Figure 7:
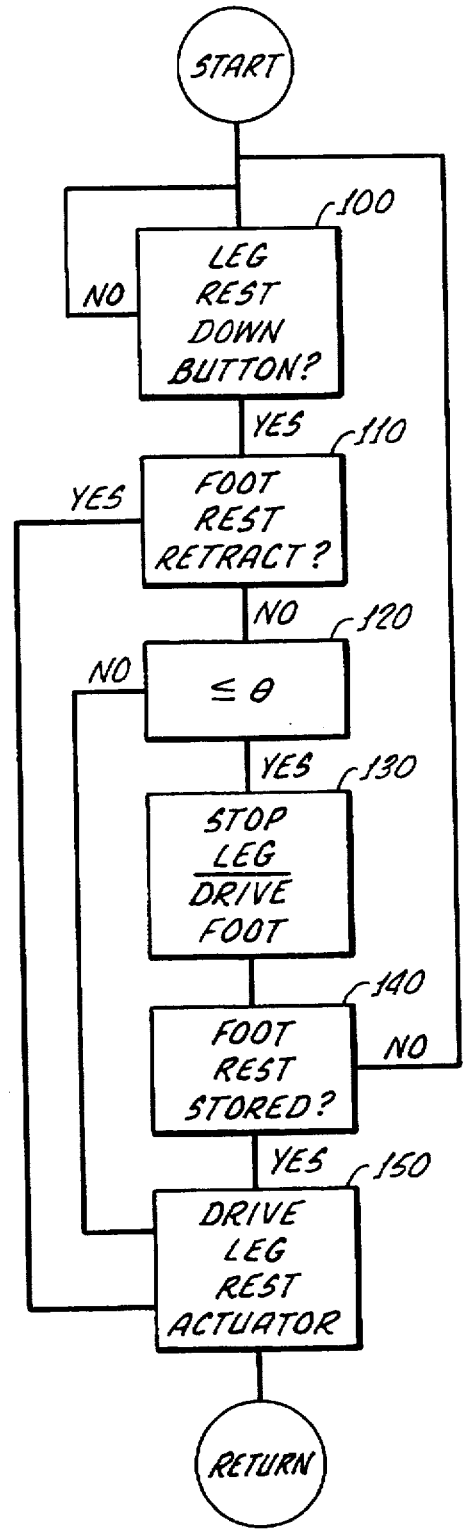
FIG. 7 is a flow chart illustrating the operation of a vehicle seat in accordance with one aspect of the present invention.

Turning to leg rest position sensing device 54, the preferred embodiment may include a cam and switch arrangement, such as that shown in FIG. 6, for determining the angular position of the leg rest. The end of leg rest 16 adjacent pivot point 30 includes a cam surface 78. The cam surface will engage an on/off switch 80 when the leg rest is oriented at a predetermined angle θ or less. When engaged, the sensor will produce an "on" signal that is sent to the CPU. Angle θ is slightly larger than the angle at which the foot rest, when fully extended, will strike the floor of the vehicle. As such, the CPU will be able to stop movement of the leg rest and/or retract the foot rest before the foot rest strikes the floor in the manner described in more detail below.

It should be noted that the on/off switch-type sensor arrangement described above may be replaced with any suitable position sensing arrangement. For example, the CPU may be used to continuously track the position of the various movable elements of the seat as a function of the previously input commands. The rotation of the actuator screws may also be monitored. Optical sensors could also be employed.

In accordance with the present invention, CPU 50 may be adapted to automatically retract foot rest 18 in response to a passenger's attempt to move leg rest 16 to an angle θ or smaller orientation when the foot rest is deployed. In order to perform this function, the CPU may be programmed to monitor the operation of the seat in the following manner. The program is preferably stored in the CPU's firmware. Referring to the numbered elements in FIG. 7, in block 100 the CPU determines whether the "leg rest down" button 64b is being pressed. If the button is being pressed, the CPU then checks to see whether or not foot rest 18 is in the fully retracted position in block 110. This may be accomplished by, for example, determining whether or not an "on" signal from the appropriate on/off switch in sensing device 56 is present. If the foot rest is in the retracted position, the CPU will drive leg rest actuator 36 in the appropriate direction. (See block 150.) If the foot rest is not retracted, the CPU checks to see whether or not the leg rest oriented at an angle less than or equal to angle θ in block 120. If not, the CPU will drive leg rest actuator 36 in the appropriate direction. If, however, the leg rest is oriented in this manner, the CPU not drive leg rest actuator 36 (or stop driving the actuator if it is already doing so) and will instead drive foot rest actuator 40 in the retract direction. (See block 130.) This process will continue until the foot rest is fully retracted. (See block 140.) Thereafter, the continued pressing of the "leg rest down" button will cause the CPU to drive the leg rest actuator in the retract direction. (See block 150.) As a result, the present invention will prevent the aforementioned damage to vehicle seats caused by the foot rest striking the floor.

The method described above may be modified in a variety of ways without departing from the spirit of the present invention. For example, the CPU does not have to stop the leg rest in order to retract the foot rest. Rather, the foot rest may be retracted as the leg rest proceeds past angle θ so long as the relative speeds of the associated actuators are such that the foot rest does not strike the ground. Additionally, if the leg rest is dimensioned such that the foot rest may be partially extended when the leg rest is in the storage position, the on/off-type sensor arrangement described above may be replaced by a sensor arrangement which continuously senses the angular position of the leg rest and the amount that the foot rest is extended. The CPU will then be able to calculate, for any combination of leg rest angular position and foot rest extension amount whether or not the foot rest should be retracted to avoid striking the floor.

The present invention may also be used to prevent passengers from operating the foot rest when such operation will result in the foot rest striking the ground. This may be accomplished in a variety of ways. For example, the CPU may simply prevent any foot rest extension if the leg rest is oriented at angle θ or less. If continuous sensing of leg rest angular position and foot rest extension amount is available, the CPU may be used to calculate the amount that the foot rest may be extended without striking the floor for a given leg rest angular position. Further extension will be prevented.

Turning to another advantageous aspect of the present invention, the CPU may be used to move the seat to the fully reclined sleep orientation shown in dashed lines in FIG. 1 or to the fully upright orientation shown in solid lines in response to the pressing of a single button. As shown by way of example in FIG. 8a, when sleep mode button 72b is pressed (block 200), CPU 50 will determine whether or not back support 14 is fully reclined, leg rest 16 is fully extended and foot rest 18, if present, is fully extended, i.e. whether the seat is in the sleep mode. (See blocks 210, 220 and 230.) The respective positions of the back support, leg rest and foot rest may be determined in the manner described above. If any portion of the seat is not oriented in the manner corresponding to the sleep mode, the CPU will drive the corresponding actuator accordingly. (See blocks 240, 250 and 260.) In addition, with respect to block 260, damage to the foot rest may be avoided in a manner similar to that described above with respect to FIG. 7.

Figure 8A:
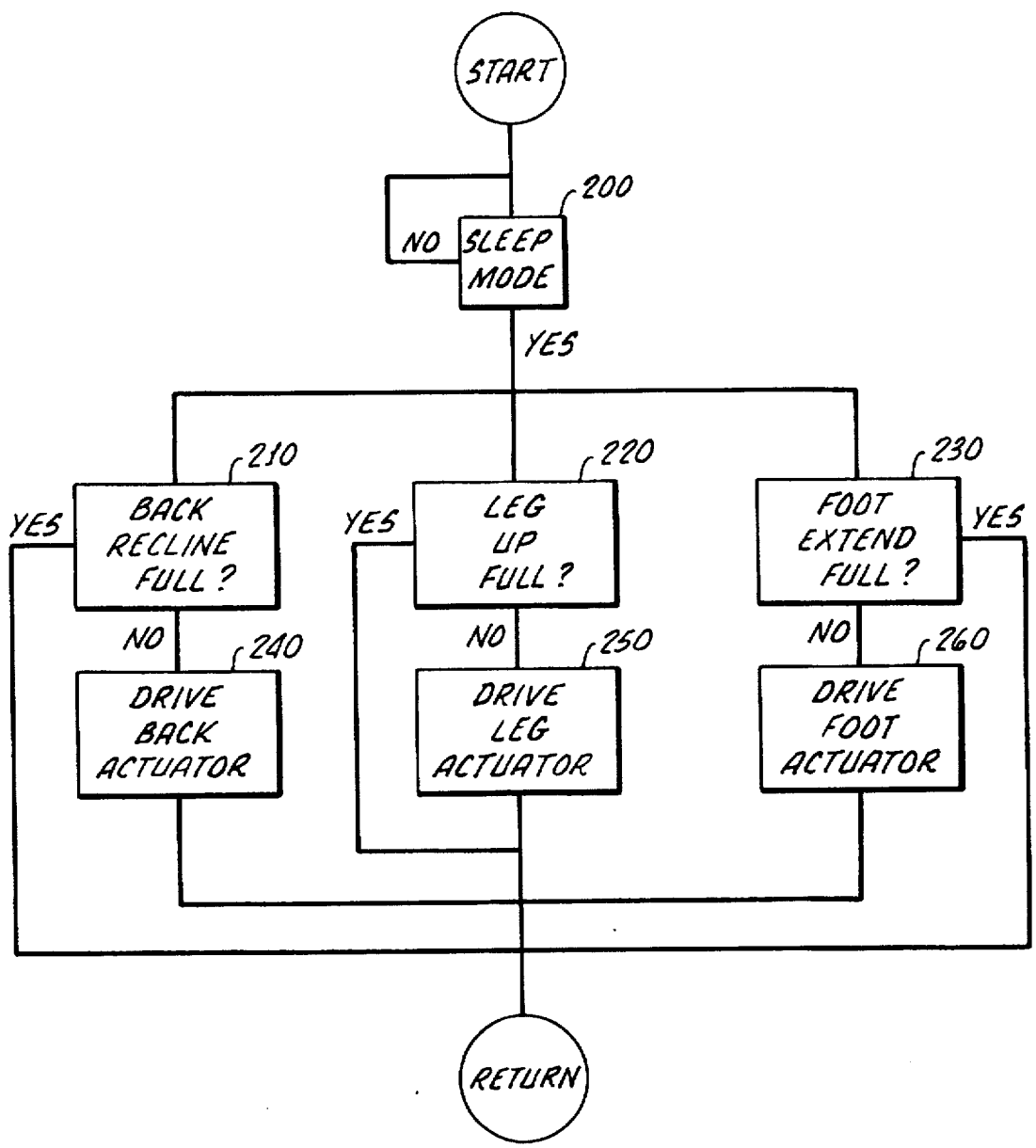
FIGS. 8a and 8b are flow charts illustrating the operation a vehicle seat in accordance with another aspect of the present invention.
Figure 8B:
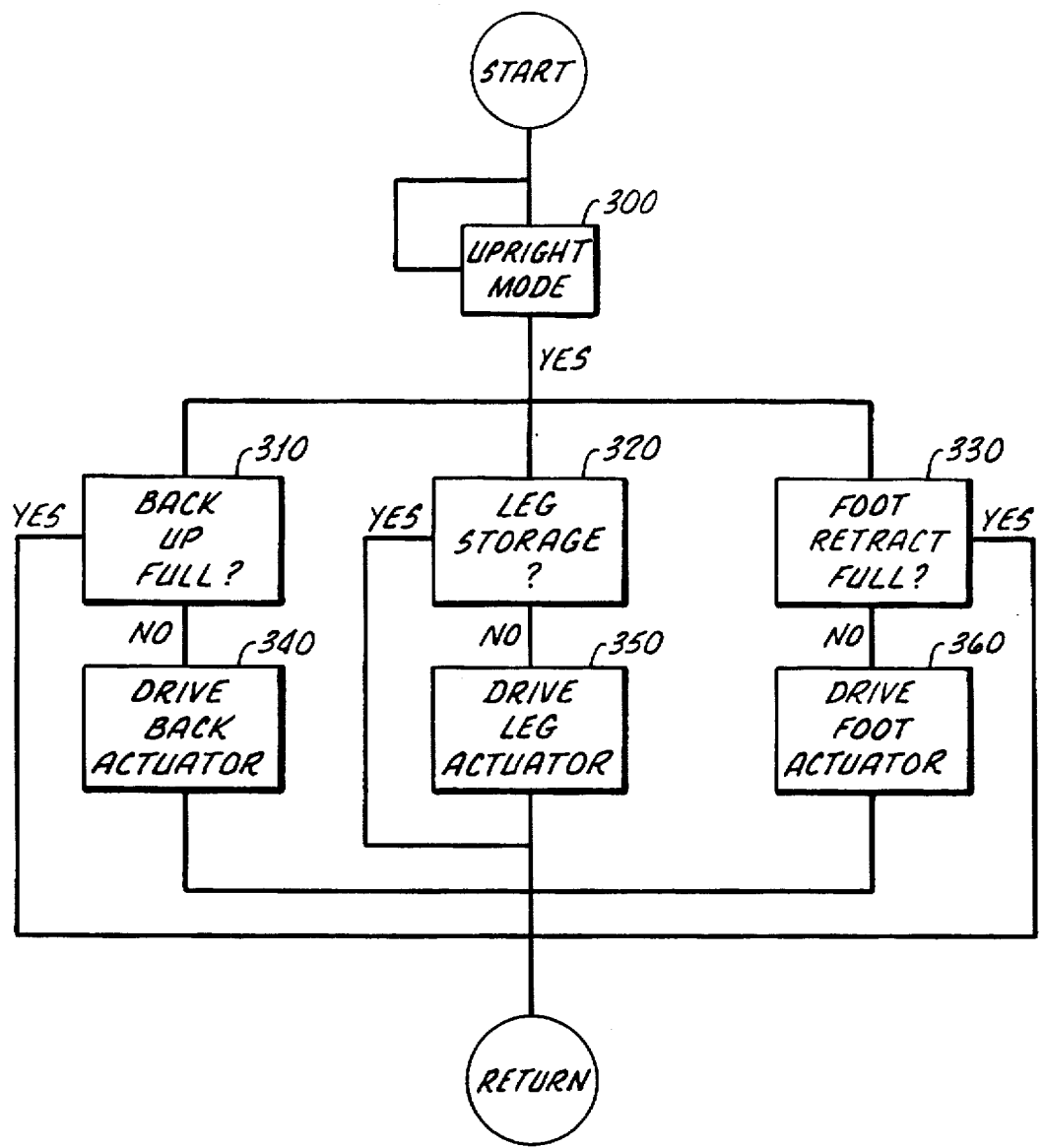

As shown by way of example in FIG. 8b, when the upright mode button 72a is pressed (block 300), CPU 50 will determine whether or not back support 14 is fully upright, leg rest 16 is in the storage position and foot rest 18, if present, is fully retracted, i.e. whether the seat is in the upright mode. (See blocks 310, 320 and 330.) The respective positions of the back support, leg rest and foot rest may be determined in the manner described above. If any portion of the seat is not oriented in the manner corresponding to the upright mode, the CPU will drive the corresponding actuator accordingly. (See blocks 340, 350 and 360.) In addition, with respect to block 360, damage to the foot rest may be avoided in a manner similar to that described above with respect to FIG. 7.

Although the present invention has been described in terms of the preferred embodiment above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

We claim:

1. A vehicle seat for use with a vehicle having a floor, comprising:

a thigh support defining a forward portion and a rearward portion;

a back support associated with the rearward portion of the thigh support and movable between an upright position and a reclined position;

a leg rest having a first end associated with the forward portion of the thigh support and a free end, the leg rest being movable between a leg rest storage position and a leg rest extended position;

a foot rest associated with the leg rest and movable between a foot rest storage position and a foot rest extended position; and a control system, operably connected to the leg rest and foot rest, adapted to automatically prevent the foot rest from striking the floor when the leg rest is moving toward the leg rest storage position.

2. A vehicle seat as claimed in claim 1, wherein the control system comprises means for determining the position of the leg rest and means for determining the position of the foot rest.

3. A vehicle seat as claimed in claim 1, wherein the control system is adapted to monitor a current position of the foot rest, determine whether the foot rest in the current position will strike the floor as the leg rest moves toward the leg rest storage position, and prevent movement of the leg rest in response to a determination that the foot rest will strike the floor as the leg rest moves toward the leg rest storage position.

4. A vehicle seat as claimed in claim 1, wherein the control system is adapted to monitor a current position of the foot rest, determine whether the foot rest in the current position will strike the floor as the leg rest moves toward the leg rest storage position, and move the foot rest toward the foot rest storage position in response to a determination that the foot rest will strike the floor as the leg rest moves toward the leg rest storage position.

5. A vehicle seat as claimed in claim 1, wherein the control system comprises a first position sensor associated with the leg rest and a second position sensor associated with the foot rest.

6. A vehicle seat as claimed in claim 5, wherein the first position sensor determines the angular position of the leg rest and the second position sensor determines a distance that the foot rest is spaced from the free end of the leg rest.

7. A vehicle seat as claimed in claim 1, wherein the control system includes a first actuator associated with the leg rest, a second actuator associated with the foot rest and an electronic control device operably connected to the first and second actuators.

8. A vehicle seat as claimed in claim 7, wherein at least one of the first and second actuators comprises a rotating screw and follower.

9. A vehicle seat system, comprising:

a seat including a thigh support defining a forward portion and a rearward portion, a back support associated with the rearward portion of the thigh support and movable between an upright position and a reclined position, and a leg rest having a first end associated with the forward portion of the thigh support and a free end, the leg rest being movable between a leg rest storage position and a leg rest extended position, the back support and leg rest defining a sleep orientation when the back support is in the reclined position and the leg rest is in the leg rest extended position, and an upright orientation when the back support is in the upright position and the leg rest is in the storage position;

a user interface associated with the seat and including a plurality of user-actuated control devices; and control means, operably connected to the seat, for moving the back support independent of the leg rest in response to the actuation of a first user-actuated control device, moving the leg rest independent of the back support in response to the actuation of a second user-actuated control device, and moving both the back support and the leg rest to one of the sleep orientation and the upright orientation in response to a single actuation of a third user-actuated control device.

10. A vehicle seat system as claimed in claim 9, wherein the control means includes a first position sensor associated with the back support and a second position sensor associated with the leg rest.

11. A vehicle seat system as claimed in claim 9, further comprising:

a foot rest associated with the free end of the leg rest and movable between a foot rest storage position and a foot rest extended position;

wherein the foot rest is in the foot rest extended position when the seat is in the sleep orientation and is in the foot rest storage position when the seat in the upright orientation.

* * * * *